US012726846B2

(12) United States Patent
Lee et al.

(10) Patent No.: US 12,726,846 B2
(45) Date of Patent: Sep. 1, 2026

(54) METHOD FOR V2X-RELATED OPERATION OF NODE IN WIRELESS COMMUNICATION SYSTEM

(71) Applicant: LG ELECTRONICS INC., Seoul (KR)

(72) Inventors: Songgun Lee, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 18/706,678

(22) PCT Filed: Nov. 2, 2021

(86) PCT No.: PCT/KR2021/015659
§ 371 (c)(1),
(2) Date: May 1, 2024

(87) PCT Pub. No.: WO2023/080262
PCT Pub. Date: May 11, 2023

(65) Prior Publication Data

US 2025/0063418 A1 Feb. 20, 2025

(51) Int. Cl.
*H04W 28/02* (2009.01)
*H04W 4/40* (2018.01)
*H04W 28/18* (2009.01)

(52) U.S. Cl.
CPC ......... *H04W 28/0221* (2013.01); *H04W 4/40* (2018.02); *H04W 28/18* (2013.01)

(58) Field of Classification Search
CPC .... H04W 4/40; H04W 28/0221; H04W 28/18
See application file for complete search history.

(56) References Cited

U.S. PATENT DOCUMENTS

2019/0088041 A1 3/2019 Lee et al.
2020/0244297 A1 7/2020 Zalewski et al.
2020/0404540 A1 12/2020 Kerpez
(Continued)

FOREIGN PATENT DOCUMENTS

KR 1020200015508 2/2020
WO 2021100937 5/2021
(Continued)

OTHER PUBLICATIONS

PCT International Application No. PCT/KR2021/015659, International Search Report dated Jul. 25, 2022, 5 pages.
(Continued)

*Primary Examiner* — Brian P Cox
(74) *Attorney, Agent, or Firm* — LEE, HONG, DEGERMAN, KANG & WAIMEY

(57) ABSTRACT

An embodiment provides a method for a soft V2X-related operation of a second node in a wireless communication system, wherein: the second node receives a negotiation message from a first node; the second node selects a delegator on the basis of the negotiation message; the second node receives a soft V2X-related message transmitted by a third node through the delegator; and the second node receives the negotiation message through an interface related to WiFi Aware, and the soft V2X-related message is received through an MQTT server.

15 Claims, 15 Drawing Sheets

(56) References Cited

U.S. PATENT DOCUMENTS

| | | | | |
|---|---|---|---|---|
| 2022/0046391 | A1* | 2/2022 | Ong | H04W 4/08 |
| 2023/0073111 | A1 | 3/2023 | Hwang et al. | |

FOREIGN PATENT DOCUMENTS

| | | |
|---|---|---|
| WO | 2021150089 | 7/2021 |
| WO | 2021182935 | 9/2021 |

OTHER PUBLICATIONS

Korean Intellectual Property Office Application No. 10-2024-7017436, Office Action dated Jan. 13, 2026, 7 1 pages.
European Patent Office Application Serial No. 21963362.5, Search Report dated Jun. 26, 2025, 11 pages.
Anastasides, "Information-Centric Communication in Mobile and Wireless Networks," University of Bern, XP055367123, Jun. 2016, 301 pages.

* cited by examiner

A SoftV2X Node (Node/or UE

WiFi Aware

FIG. 15

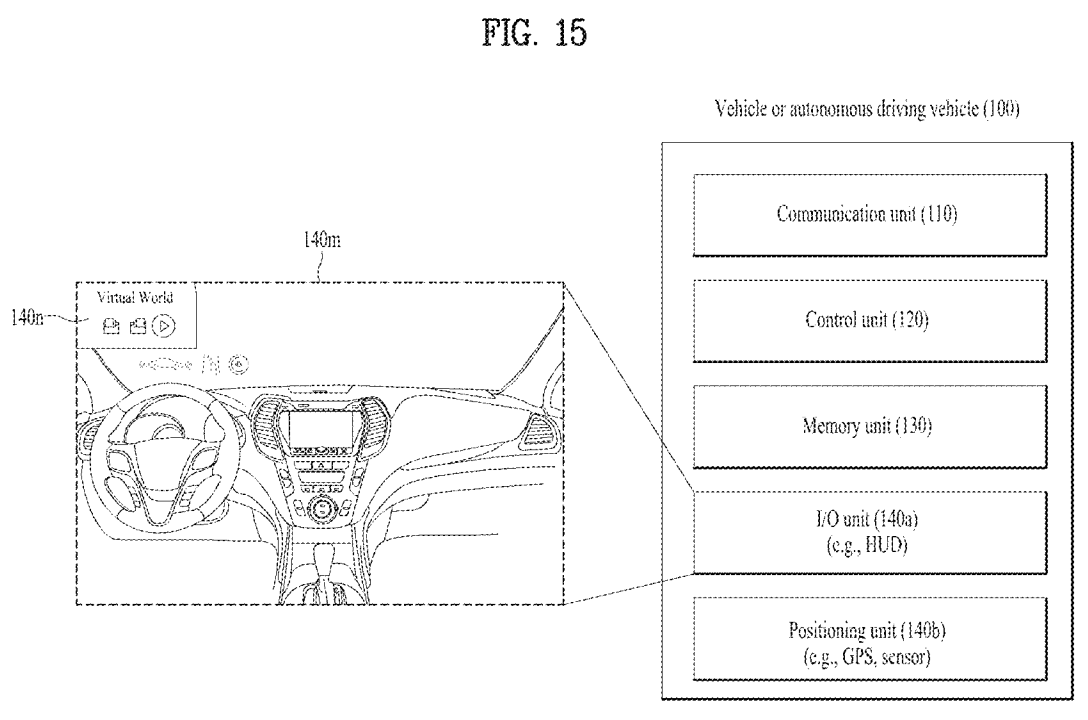

Vehicle or autonomous driving vehicle (100)

Communication unit (110)

Control unit (120)

Memory unit (130)

I/O unit (140a)
(e.g., HUD)

Positioning unit (140b)
(e.g., GPS, sensor)

140m

Virtual World

140m

METHOD FOR V2X-RELATED OPERATION OF NODE IN WIRELESS COMMUNICATION SYSTEM

CROSS-REFERENCE TO RELATED APPLICATION(S)

This application is the National Stage filing under 35 U.S.C. 371 of International Application No. PCT/KR2021/015659, filed on Nov. 2, 2021, the contents of which are all incorporated by reference herein in its entirety.

TECHNICAL FIELD

The following description relates to a wireless communication system, and more particularly, a method and device for transmitting and receiving a vehicle-to-everything (V2X) message in a situation in which nodes that support WiFi Aware and nodes that do not support WiFi Aware coexist.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the base station (BS) of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing radio access technologies (RATs). Accordingly, a communication system is under discussion, for which services for UEs sensitive to reliability and latency issues are considered. The next-generation RAT in which evolved mobile broadband (eMBB), machine-type communication (MTC), and ultra-reliable, low-latency communication (URLLC) are considered is referred to as new RAT or new-radio (NR) communication. In NR, V2X communication may also be supported.

DISCLOSURE

Technical Problem

An object of embodiment(s) is to provide a method of transmitting and receiving a vehicle-to-everything (V2X) message in a situation in which nodes that support WiFi Aware and nodes that do not support WiFi Aware coexist, and a method of selecting a delegator.

Technical Solution

According to an embodiment, an operation method of a second node related to soft vehicle-to-everything (V2X) in a wireless communication system includes receiving a negotiation message from a first node by the second node, selecting a delegator based on the negotiation message by the second node, and receiving a soft V2X-related message transmitted by a third node through the delegator by the second node, wherein the second node receives the negotiation message through an interface related to WiFi Aware and receives the soft V2X-related message through a message queuing telemetry transport (MQTT) server.

According to an embodiment, a second node related to soft V2X in a wireless communication system includes at least one processor, and at least one computer memory operatively connected to the at least one processor and configured to store instructions that when executed causes the at least one processor to perform operations, wherein the operations include receiving a negotiation message from a first node, selecting a delegator based on the negotiation message, and receiving a soft V2X-related message transmitted by a third node through the delegator, and the second node receives the negotiation message through an interface related to WiFi Aware and receives the soft V2X-related message through an MQTT server.

According to an embodiment, provided is a processor for performing operations for a second node in a wireless communication system, the operations including receiving a negotiation message from a first node, selecting a delegator based on the negotiation message, and receiving a soft V2X-related message transmitted by a third node through the delegator, wherein the second node receives the negotiation message through an interface related to WiFi Aware and receives the soft V2X-related message through an MQTT server.

According to an embodiment, provided is a non-volatile computer-readable storage medium storing at least one computer program including an instruction that when executed by at least one processor causes the at least one processor to perform operations for a relay UE, the operations including receiving a negotiation message from a first node, selecting a delegator based on the negotiation message, and receiving a soft V2X-related message transmitted by a third node through the delegator, wherein the second node receives the negotiation message through an interface related to WiFi Aware and receives the soft V2X-related message through an MQTT server.

The third node may have a same topic as the first node and the second node and may be a node without an interface related to the WiFi Aware.

Based on that the second node is not a delegator, the second node may select a delegator through comparison of score field values of the negotiation message.

Based on that the first node is not a delegator, the second node may compare a score field value thereof with a score field value of the negotiation message and select a node with a smaller score field value as a delegator.

Based on that the first node is a delegator, the second node may add the first node to a peer delegator list and may then select a node with a smallest score field value in the peer delegator list as a delegator.

The score field value may increase by 1 based on that a message of another node as a delegator is transmitted to an MQTT server.

Based on the second node is a delegator, the second node may create geocast connection with the MQTT server.

The second node may transmit the soft V2X-related message to the first node through an interface related to the WiFi Aware.

Based on the soft V2X-related message is transmitted from a pedestrian, the soft V2X-related message may not be transmitted to the pedestrian.

The negotiation message may include a node ID field, a topic ID field, a field indicating whether the second node is a delegator, and a score field.

The soft V2X-related message may be any one of a basic safety message (BSM) or a personal safety message (PSM).

The BSM or PSM message may include a node ID field, a topic ID field, a delegator request field indicating whether to request message transmission to a delegator, and a type field indicating a type of node from among a pedestrian or a vehicle.

Advantageous Effects

According to an embodiment, even in a situation in which nodes that support WiFi Aware and nodes that do not support WiFi Aware coexist, power, data fees, message latency, and server load may be reduced by direct communication between adjacent devices. Smartphone power consumption may be reduced using short range communication, and mobile data usage may be reduced using less cellular network. Direct communication may reduce message latency and reduce server load by reducing a message that the geocast server needs to process.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 12 to 15 are diagrams for explaining various devices to which embodiment(s) are applicable.

BEST MODE

In various embodiments of the present disclosure, "/" and "," should be interpreted as "and/or." For example, "A/B" can mean "A and/or B." Further, "A, B" can mean "A and/or B." Further, "A/B/C" can mean "at least one of A, B and/or C." Further, "A, B, C" can mean "at least one of A, B and/or C."

In various embodiments of the present disclosure, "or" should be interpreted as "and/or." For example, "A or B" can include "only A," "only B," and/or "both A and B." In other words, "or" should be interpreted as "additionally or alternatively."

Figure 1:
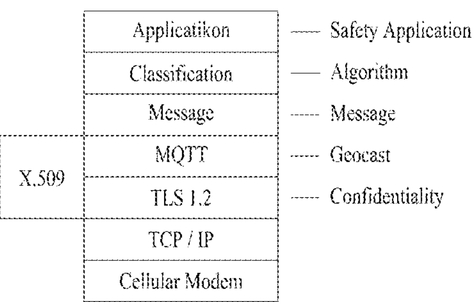
FIG. 1 is a diagram showing a SoftV2X protocol stack.

FIG. 1 is a diagram showing a SoftV2X protocol stack operable in a UE, a smartphone, etc. Each layer of the SoftV2X protocol stack will be described with reference to FIG. 1. Here, SoftV2X is one V2X communication method in which a method described below is used, and the following description is not limited to the term SoftV2X. In addition, other terms referring to a communication method corresponding to the following description can also be considered as corresponding to SoftV2X in the present disclosure.

Cellular Modem is a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In SoftV2X, unicast communication is performed unlike in the situation of V2X.

In SoftV2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, SoftV2X protocol is configured to perform the geocast function of sending messages only to users in a specific area. To this end, Message Queuing Telemetry Transport (MQTT), which is an issue-subscription-based messaging protocol, is used.

Subsequently, SoftV2X uses the message defined in SAE J2735 (BSM, PSM, RSA, etc.). SAE J2735 defines signal specifications such as messages, data frames, element formats, structures and the like for V2V/V2I communication, and the main messages are shown in Table 1 below.

TABLE 1

| Main Messages | Use range | Contents |
|---|---|---|
| BSM (Basic Safety Message) | V2V | Provides overall safety-related information. Broadcasting communications with periodicity of 100 ms. |
| PVD (Probe Vehicle Data) | V2I | Delivers 'Prove data' collected on a vehicle to RSU. |
| MapData | I2V | Provides information on intersections and road topographic data. |
| SPaT (SinglePhaseAndTiming) | I2V | Used in conjunction with MapData to provide information on signal phase and time synchronization of movement at the intersection. |

TABLE 1-continued

| Main Messages | Use range | Contents |
|---|---|---|
| RTCMCorrections (Real-Time Differential Correction Maritime) | I2V | Message to provide RTCM correction information. |
| PSM (Personal SafetyMessage) | V2P | Provides information about pedestrians in danger range. |
| PDM (ProveDataManagement) | I2V | Message for managing PVD messages. |
| RSA (RoadSideAlert) | V2X | Supports generation of ad-hoc message from public safety vehicle and RSU. |
| SSM (Signal StatusMessage) | I2V | Used for response to Facility Operational Status Request. |
| SRM (SignalRequestMessage) | V2I | Message for vehicle entering intersection to obtain service information from signal controller. |
| TIM (TravelerInformationMessage) | I2V | Message that conveys information on various traffic information, unexpected situations, pre-road work, etc. |
| CSR (CommonSafetyRequest) | V2V | Request message for data support for safety information exchange. |
| EVA (EmergencyVehicleAlert) | V2X | Deliver information about emergency vehicle. |
| ICA (IntersectionVehicleAlert) | V2X | Deliver information about vehicle hazard conditions near intersections. |
| NMEACorrections | I2V | Used for transmitting message of initial GPS data format on DSRC channel. |
| testMessages00-15 | N/A | Used in customized message format for each use region. |
| Not Assigned | N/A | Assigned when adding new message content. |

Subsequently, a classification layer performs an algorithm to generate data necessary for risk determination. An application layer determines whether or not it is dangerous based on the data that raised Classification, thereby informing pedestrians and drivers carrying smartphones.

Figure 2:
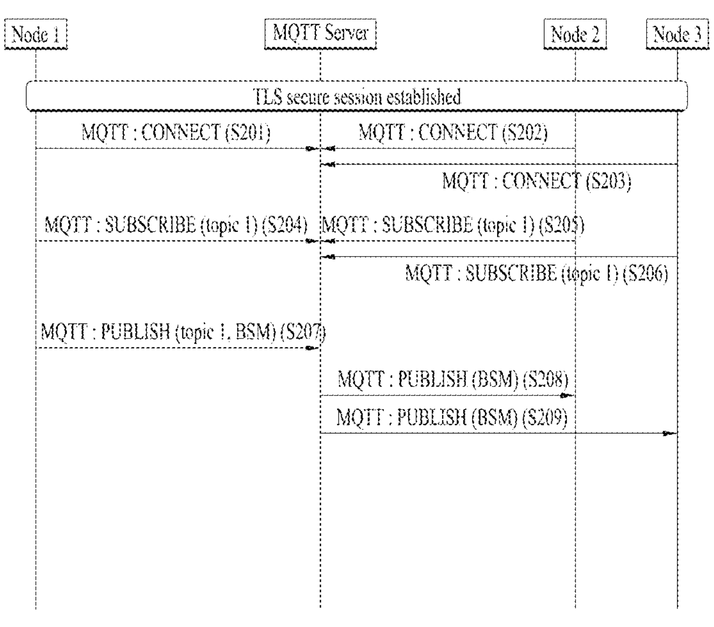
FIG. 2 is a flowchart showing an example of performing geocast using a message queuing telemetry transport (MQTT) in SoftV2X.

FIG. 2 is a flowchart showing an example of performing geocast using MQTT in SoftV2X. In Legacy V2X, devices in the same region can naturally receive messages (such as BSM, etc.) through a broadcast channel. However, since cellular networks use unicast communication, SoftV2X uses MQTT to perform unicast transmission to all devices in the same region, resulting in broadcast-like effects.

For MQTT communication, a secure session is first set up between all nodes and a server using TLS. Each node can first perform a CONNECT process and then perform a SUBSCRIBE process on a specific topic (S201 to S203 of FIG. 2). In this case, a topic is selected differently depending on a region. A map can be divided by a tile, and the same topic value can be given to each tile. Therefore, each of the nodes performs SUBSCRIBE by selecting a topic according to a tile in which the corresponding node is located. For example, in FIG. 2, Nodes 1, 2, and 3 were all present in the same tile (region and subscribed to the same topic 1 (S204 to 206 in FIG. 2).

When the Node1 transmits PUBLISH (BSM) to the MQTT server (S207), the server delivers the PUBLISH (BSM) in a unicast manner to all nodes having subscribed to the topic1 (S208, S209). Each of the Node 2 and the Node 3 performs Classification and Threat Assessment based on the received BSM message. If detecting danger, the corresponding node informs smartphone users (e.g., pedestrian and driver) of the detection of the danger. A car or vehicle transmits BSM and a pedestrian transmits PSM, and these messages basically contain information (e.g., ID, location, speed, acceleration, direction, etc.) necessary for danger detection.

Wi-Fi Aware (Wi-Fi CERTIFIED Wi-Fi Aware) enables rapid discovery, connection, and data exchange with other Wi-Fi devices without traditional network infrastructure, Internet connection, or GPS signals, and Wi-Fi CERTIFIED Wi-Fi Aware™ is a method for rapid discovery, connection, and data exchange with other Wi-Fi devices without traditional network infrastructure, Internet connection, or GPS signals.

In other words, Android WiFi Aware provides a function for SoftV2X devices to search for a counterpart and transmit messages without any other type of connection, and has the following main functions.

- Search for other devices: The process starts when one device starts a searchable service. If another device subscribes to the corresponding service, a notification that an initiator is discovered is received.
- Message transmission: After two devices search for each other, messages may be transmitted through a two-way Wi-Fi Aware network without an access point.

Figure 3:
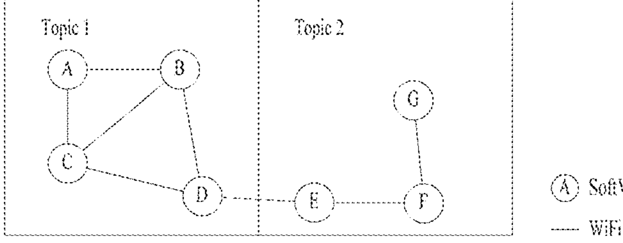
FIG. 3 illustrates a network topology of Wi-Fi Aware.

FIG. 3 illustrates a network topology of Wi-Fi Aware. Referring to FIG. 3, a SoftV2X terminal may discover a nearby terminal by Service discovery (Publish/Subscribe). Each SoftV2X UE exchanges information with terminals in one hop discovery area. In other words, A exchanges information with B and C, but does not exchange information with D. WiFi is capable of connecting over long distances, and thus when determining that D is outside a safe service provision area and transmitting information through multi hop, latency increases, and thus D may not provide multi-hop message transmission. Nodes D and E are in close proximity to each other, and thus service discovery is possible, but the D and E have different topics, and thus do not exchange information with each other. The reason for clustering by topic is because a delegator transmits a message through mobile communication for each topic. UEs connected via WiFi aware exchange information (location, kinematics) required for a service through direct WiFi communication without an AP rather than through a server.

Information is basically transmitted through BSM and PSM messages via a mobile communication network to all nodes in the same area in information delivery in geocast-based SoftV2X. BSM and PSM need to be transmitted periodically (within 1 second), and therefore LTE/5G modem of a smartphone needs to be continuously used. However, LTE/5G Modem consumes the most power in a smartphone along with a display. When mobile data is continuously used, data charges is incurred. The message is transmitted through an application server through a mobile network, and thus message latency occurs, and when there are many users, a server load increases.

To resolve the problems of increasing power, data charges, message latency, and server load in SoftV2X, WiFi which consumes less power through short-distance communication, does not use mobile data, and has lower message latency than mobile communication may be used. Direction communication between adjacent devices using WiFi without an access point (AP) uses the WiFi Aware provided by Android and the Multpeer Connectivity Framework function provided by iOS. UE discovery and message transmission are possible through WiFi Aware. However, there is a problem that the WiFi Aware function only operates on UEs that support Android 8.0 or higher and does not operate on devices lower than that.

Therefore, a method of performing transmission and reception using WiFi Aware in softV2X, in particular, a processing method when UEs that do not support WiFi Aware and UEs that support WiFi Aware coexist will be described in detail.

Figure 4:
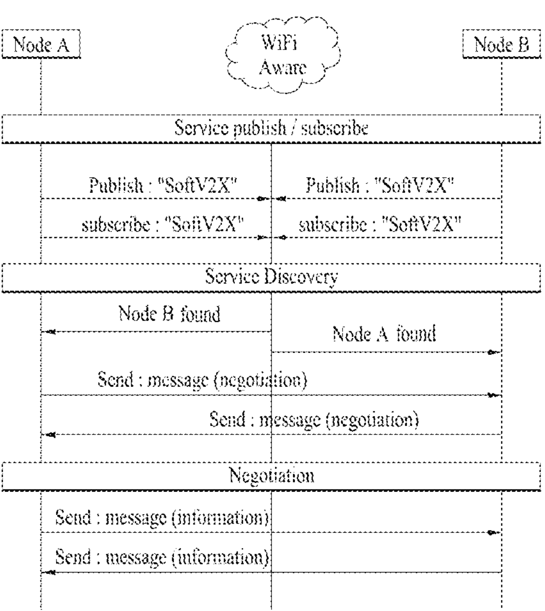
FIGS. 4 to 10 are diagrams for explaining embodiment(s)

In an embodiment, a second node may receive a negotiation message from the first node. The negotiation message may be received during a service discovery process as shown in FIG. 4. In more detail, when SoftV2X starts, each UE starts the "SoftV2X" service and performs subscription. When a UE that starts the "SoftV2X" service is discovered in a nearby area, WiFi Aware transmits information of the service-initiated UE to the SoftV2X APP. When the SoftV2X APP receives information from a counterpart UE through WiFi Aware application programming interface (API), the SoftV2X APP transmits negotiation information to the counterpart UE to select a delegator.

Subsequently, the second node may select a delegate based on the negotiation message. Through the delegator selected as such, the second node may receive soft V2X-related messages transmitted by a third node.

Here, the second node may receive the negotiation message through an interface related to WiFi Aware, and the soft V2X related message may be received through an MQTT server.

The third node has the same topic as the first node and the second node, and is a node without an interface related to the WiFi Aware. In other words, in a situation in which UEs that support WiFi Aware and UEs that do not support WiFI in softV2X, a delegator is selected for nodes that do not support WiFi Aware, and through the delegator, transmission and reception are possible with nodes that do not support WiFi Aware. Nodes that support WiFi Aware may communicate directly with each other through WiFi Aware.

Figure 5:
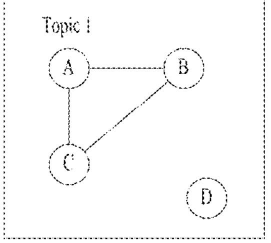

This is shown as in FIG. 5. In detail, the first node (softV2X Node A), the second node (softV2X Node B), and the fourth node (softV2X Node C) in FIG. 5 are UEs that support WiFi Aware, and the third node (softV2X Node D) is a node that is not related to WiFi Aware, that is, a UE that does not support WiFi Aware. Therefore, messages need to be exchanged using mobile communication with nearby UEs that do not support WiFi Aware. Therefore, from among UEs that support WiFi Aware, a specific UE needs to function as a delegator to exchange a message with UEs that do not support WiFi Aware. A delegator UE transmits a message by using WiFi and mobile communication simultaneously.

Figure 6:
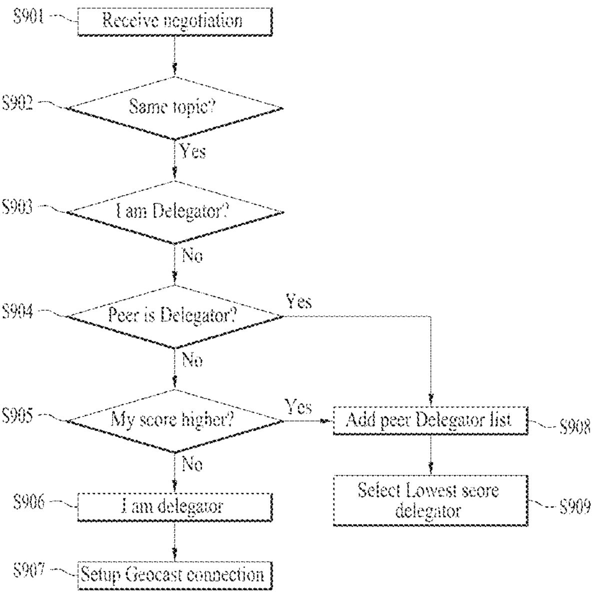

Based on that the second node is not a delegator, the second node may select a delegator through comparison of score field values of the negotiation message. In this regard, referring to FIG. 6, when receiving the negotiation message (S901), the second node checks whether the second node and the counterpart node (which transmits the negotiation message) belong to the same topic (S902). When the second node is not a delegator (S903), the second node checks whether the counterpart node is a delegator (S904). When the counterpart node is not a delegator, the second node checks whether a score value of the second node is greater than a score value of the counterpart node (S905), and when the score value of the second node is less than the score value of the counterpart node, the second node is a delegator. That is, when the first node is not a delegator, the second node compares a score field value thereof with a score field value of the negotiation message and selects a node with a smaller score field value as a delegator.

When the first node is a delegator, the second node adds the first node to a peer delegator list and then selects the node with the smallest score field value in the peer delegator list as a delegator. That is, when the counterpart node is a delegator, the counterpart node is added to the delegator list (S908), and selects the node with the smallest score value in the delegator list as a delegator (S909). When the counterpart node is a delegator, the counterpart node is added to the delegator list. A UE with the smallest score from the delegate list is selected as a delegator. When the second node is a new delegator, the second node creates geocast connection and communicates with a server. All nodes including the second node need to be connected to one or more delegators.

The negotiation message may include a node ID field, a topic ID field, a field indicating whether the second node is a delegator, and a score field. In other words, the negotiation message may be the same as the example in Table 2 below, and is transmitted in json type.

TABLE 2

```
{
"node id" : integer, -- Unique id of UE
"topic id" : integer, -- id of topic in which UE is located
"delegator" : "true" or "false",
"score" : integer
}
```

A delegator field indicates whether the second node is currently a delegator. When there is already a delegate within a cluster, True is transmitted. The score increases by 'l' when the second node as a delegator transmits a message of another UE to a server. In other words, the score field value increases by 1 when a message of another node as a delegator is transmitted to an MQTT server. The score decreases, a corresponding node is selected as a delegator.

Delegator selection always occurs during a negotiation process after the counterpart node is discovered. When the second node is selected as a delegator, connection is established with the server and a message is transmitted instead. That is, in the above embodiment, when the second node is a delegator, the second node creates geocast connection with the MQTT server.

Figure 7:
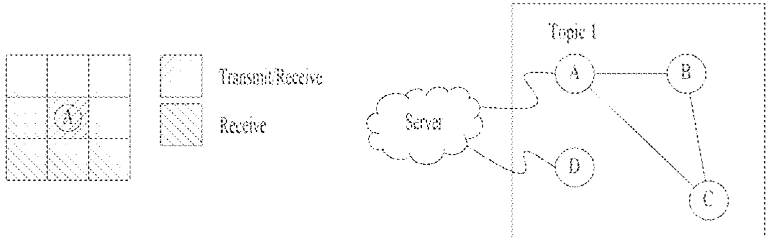

Once the negotiation process as described above is completed, an information message containing information of the second node is transmitted to all UEs in the cluster. When exchanging information with a nearby UE through a geocast server, as shown in FIG. 7, the second node publishes information thereof on one topic to which the second node belongs and receives information of the counterpart UE from 9 surrounding topics (including topic of the second node). The reason for publishing/subscribing asymmetrically is to prevent duplicate reception.

In FIG. 7, nodes A, B, and C belonging to the same topic exchange information with each other through WiFi Aware, but D does not support WiFi Aware, and thus may not exchange information with nodes A, B, and C through WiFi Aware. From among nodes A, B, and C, a UE with the smallest score is selected through a negotiation process. In an embodiment, A is selected as a delegator. When A is selected as a delegator, the node A needs to transmit not only a message thereof to the server but also messages on behalf of B and C. D receives messages from nodes A, B, and C from the MQTT server. A receives a message of D from the server and transmits the message of D to B and C. Here, the information message may is transmitted in json type as shown in Table 3 below.

TABLE 3

```
{
"node id" : integer, -- Unique id of UE
"topic id" : integer, -- id of topic in which UE is located
"delegator" : "true" or "false",
"delegate request" : "true" or "false",
"neighbor" : [integer1, integer2, ...] - exists only
when delegate request is true
"type" : "vehicle" or "pedestrian" ...,
"J2735 message" : byte array - J2735 BSM / PSM message
}
```

In relation to Table 3 above, when a transmitting side is a delegator, a "delegator" field is set to true and transmitted to a surrounding node. A receiving side manages a nearby delegate list through a delegate field. A 'delegate request' field is set to true only when the transmitting side transmits an information message to a delegate node. In this case, a list of all UEs that exchange information with the node A is transmitted to a 'neighbor' field. The J2735 message is an encoded byte array according to the ASN. 1 BSM/PSM syntax defined in the SAE J2735 standard. This message contains information related to location and kinematics.

Figure 9:
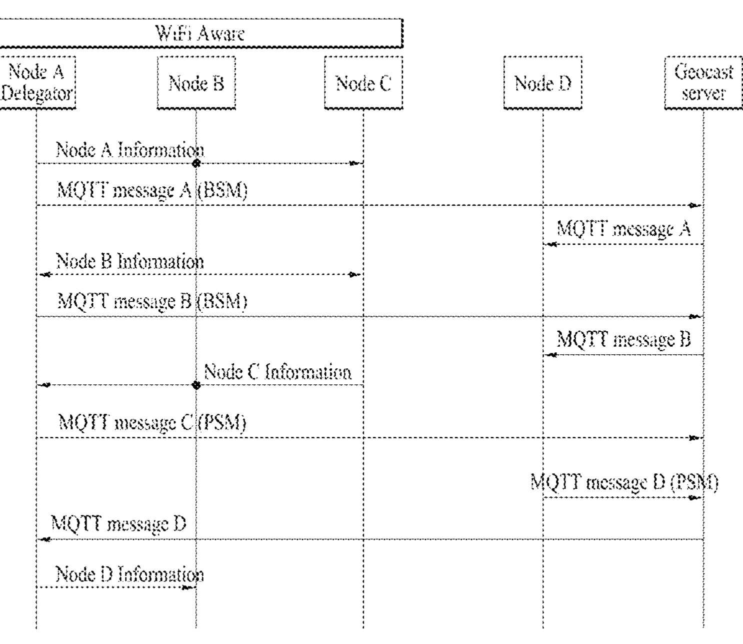

Continuously, FIG. 9 is a flowchart related to a method of releasing a selected delegator. The delegator checks the "delegate request" field provided in the received message (S901), and when the delegate request is not transmitted for a certain time (S902), the delegator is not maintained any longer and is released (S903). One node from the nearby delegate list is selected (S904). When the delegator is selected, communication with the MQTT server is stopped (S905).

FIG. 9 shows a process of transmitting and receiving a message after nodes A, B, C, D of FIG. 5 and the geocast server (e.g., MQTT server) perform WiFi Aware connection, delegator selection, and geocast server connection as described above.

Nodes A, B, and C may transmit and receive messages without using mobile communication through WiFi Aware. That is, in the above embodiment, the second node transmits the soft V2X-related message to the first node through an interface related to the WiFi Aware. To exchange information with node D which does not support WiFi Aware, the nodes B and C exchange messages through a delegator the node A. Tables 4 to 6 below show examples of messages exchanged between node A, node B, and node C through the delegator and the server.

TABLE 4

```
{
"node id" : A id
"topic id" : 1,
"delegate request" : "false",
"type" : "vehicle"
"J2735 message" : BSM
}
```

TABLE 5

```
{
"node id" : B id
"topic id" : 1,
"delegate request" : "true",
"neigobor" : [A id, C id]
"type" : "vehicle"
"J2735 message" : BSM
}
```

TABLE 6

```
{
"node id" : C id
"topic id" : 1,
"delegate request" : "true",
"neigobor" : [A id, B id]
"type" : "pedestrian"
"J2735 message" : PSM
}
```

The "delegate request" in the information message received by the node A from the nodes B and C is true, and thus the corresponding message is transmitted to the geocast server. A neighbor field of each node is used when a message from geocast is received.

When the node A receives a message of the node D from MQTT, the node A transmits the corresponding message to all nodes that request a delegate from the node A. In this case, when a message D received from geocast is provided in neighbors of B and C, the message D is not transmitted. (D is not a neighbor of B and C, and thus a message is transmitted), and a message of a pedestrian is not transmitted to a node of the pedestrian. Therefore, the node A transmits a message of the node D only to the node B. Likewise, a message of the node C, received from the geocast server, is not transmitted to the node D. (because it is the same pedestrian)

Figure 10:
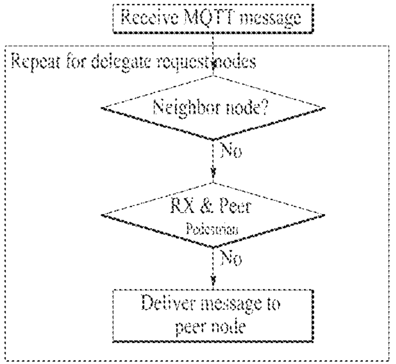

FIG. 10 is a flowchart showing an example of a process in which a delegator, receiving a message from an MQTT server, determines whether to transmit the message to another node. Referring to FIG. 10, when a delegator node receives a message from MQTT, the delegator node determines whether to transmit the message to all nodes that request a delegate from the delegator node. When the received message id is not a neighbor of a node that requests a delegate and both nodes are not pedestrians, the message is transmitted.

Based on the above description, a second node related to soft V2X includes at least one processor, and at least one computer memory operatively connected to the at least one processor and configured to store instructions that when executed cause the at least one processor to perform operations, and the operations include discovering a first node, receiving a negotiation message from the first node, selecting a delegator based on the negotiation message, and receiving a soft V2X-related message transmitted by a third node through the delegator, and the second node receives the negotiation message through an interface related to WiFi Aware and receives the soft V2X-related message through an MQTT server.

Provided is a processor for performing operations for a second node, the operations include discovering a first node, receiving a negotiation message from the first node, selecting a delegator based on the negotiation message, and receiving a soft V2X-related message transmitted by a third node through the delegator, and the second node receives the negotiation message through an interface related to WiFi Aware and receives the soft V2X-related message through an MQTT server.

Provided is a non-volatile computer readable storage medium storing at least one computer program that includes an instruction that when executed by at least one processor causes the at least one processor to perform operations for a relay UE, the operations include discovering a first node, receiving a negotiation message from the first node, selecting a delegator based on the negotiation message, and receiving a soft V2X-related message transmitted by a third node through the delegator, and the second node receives the negotiation message through an interface related to WiFi Aware and receives the soft V2X-related message through an MQTT server.

Example of communication system to which the present disclosure is applied

Figure 11:
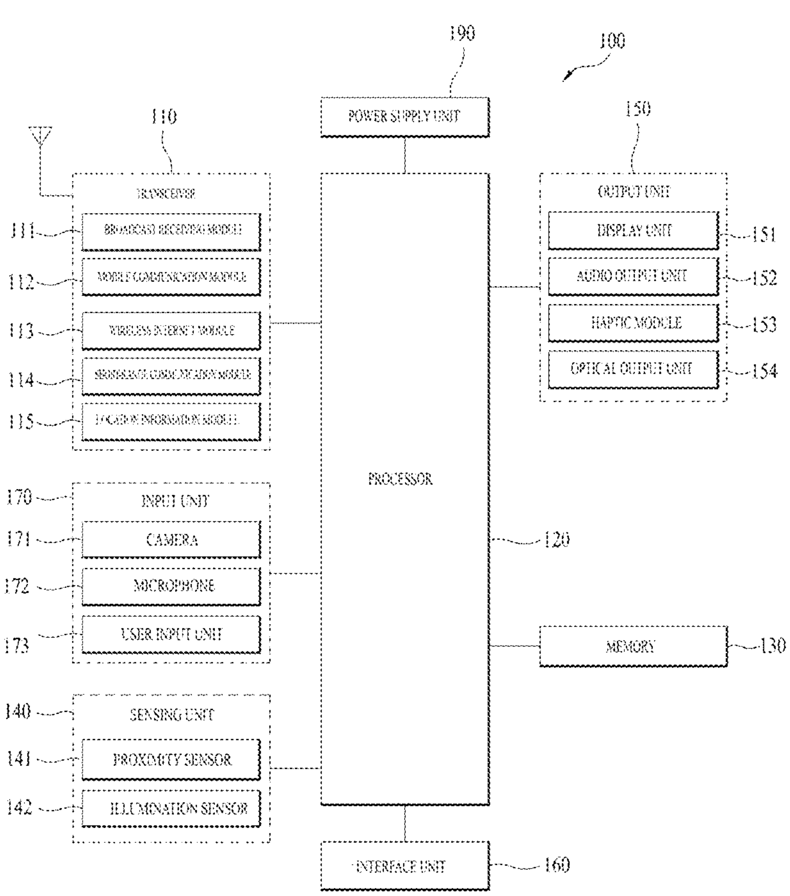
FIG. 11 is a block diagram for explaining user equipment (UE)/mobile terminal/terminal related to the present disclosure.

FIG. 11 is a block diagram for explaining user equipment (UE)/mobile terminal/terminal related to the present disclosure. In the following description, a module is a set of devices configured to perform a specific function and may also be referred to as a unit or device.

Figure 8:
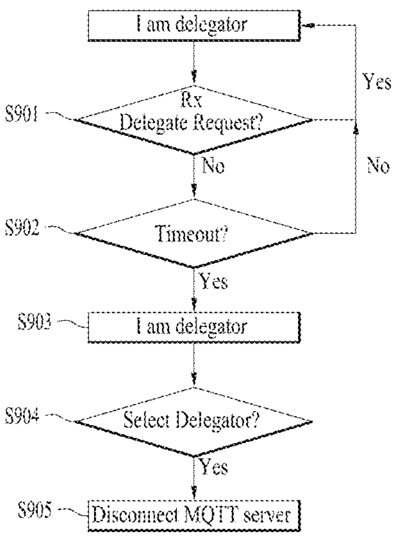

The mobile terminal 100 may include a transceiver 110, a processor 120, a memory 130, a sensing unit 140, an output unit 150, an interface unit 160, an input unit 170, and a power supply unit 190. The components illustrated in FIG. 8 are not required for implementing a mobile terminal, and thus, the mobile terminal described herein may have more or fewer components than those listed above.

The transceiver 110 typically includes one or more modules for performing wireless communication between the mobile terminal 100 and a wireless communication system, communications between the mobile terminal 100 and another mobile terminal 100, or between the mobile terminal 100 and an external server. The transceiver 110 may include one or more modules which connect the mobile terminal 100 to one or more networks.

The transceiver 110 may include at least one of a broadcast receiving module 111, a mobile communication module 112, a wireless Internet module 113, a short-range communication module 114, and a location information module 115.

The input unit 170 may include a camera 171 or an image input unit for inputting an image signal, a microphone 172 or an audio input unit for inputting an audio signal, and a user input unit 173 (e.g., a touch key, a push key or a mechanical key) for allowing a user to input information. Voice data or the image data collected by the input unit 170 may be analyzed and processed as a control command of a user.

The sensing unit 140 may include one or more sensors configured to sense internal information of the mobile terminal, surrounding environment information of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB gyro sensor, an infrared sensor (IR sensor), a finger scan sensor, an ultrasonic sensor, an optical sensor (e.g. a camera 171), a microphone 172, a battery gauge, an environmental sensor (e.g. a barometer, a hygrometer, a thermometer, a radioactivity detection sensor, a heat detection sensor, or a gas detection sensor), a chemical sensor (e.g. an electronic nose, a healthcare sensor, or a biometric sensor). The mobile terminal disclosed in the present specification may combine and utilize information sensed by at least two sensors from among the sensors.

The output unit 150 may generate visual, auditory, or tactile output and include at least one of a display unit 151, an audio output unit 152, a haptic module 153, and an optical output unit 154. The display unit 151 may have an inter-layered structure or an integrated structure with a touch sensor, thereby implementing a touch screen. The touch screen may provide an output interface between the mobile terminal 100 and a user, as well as function as the user input unit 173 which provides an input interface between the mobile terminal 100 and the user.

The interface unit 160 serves as an interface with various types of external devices to be coupled to the mobile terminal 100. The interface unit 160 may include at least one of a wired/wireless headset port, an external charger port, a wired/wireless data port, a memory card port, a port for connection of a device having an identification module, an audio input/output (I/O) port, a video I/O port, and an earphone port. The mobile terminal 100 may perform assorted control functions related with a connected external device, in response to the external device connected to the interface unit 160.

The memory 130 stores data to support various functions or features of the mobile terminal 100. The memory 130 may be configured to store a plurality of application programs (application program or application) executed in the mobile terminal 100, and data or instructions for operations of the mobile terminal 100. Some of these application programs may be downloaded from an external server via wireless communication. At least some of the applicable programs may be installed in the mobile terminal 100 at time of manufacturing or shipping, for basic functions of the mobile terminal 100 (for example, receiving a call, placing a call, receiving a message, or sending a message). The application programs may be stored in the memory 130, installed on the mobile terminal 100, and executed by the processor 120 to perform an operation (or function) of the mobile terminal 100.

The processor 120 typically functions to control overall operations of the mobile terminal 100 in addition to the operations related with the application programs. The processor 120 may provide or process a signal, data, or information, which is input or output through the above-described components, or may provide or process information or functions appropriate for the user by driving the application program stored in the memory 130.

The processor 120 may control at least some of the components illustrated in FIG. 11 to drive the application program stored in the memory 130. The processor 120 may operate at least two of the components provided in the mobile terminal 100 in combination to drive the application program.

The power supply unit 190 receives external power and internal power under control of the processor 120 and supplies power to each component provided in the mobile terminal 100. The power supply unit 190 may include a battery, and the battery may be an embedded battery or a replaceable battery.

At least some of the components may cooperatively operate to implement an operation, a control, or a control method of a mobile terminal according to various embodiments described below. The operation, control, or control method of the mobile terminal may be implemented on the mobile terminal by driving at least one application program stored in the memory 130.

Hereinafter, the aforementioned components will be described in more detail with reference to FIG. 11, prior to describing various embodiments implemented through the mobile terminal 100.

Regarding the transceiver 110, the broadcast receiving module 111 of the transceiver 110 receives a broadcast signal and/or broadcast-related information from an external broadcast managing entity via a broadcast channel. The broadcast channel may include a satellite channel and a terrestrial channel. Two or more broadcast receiving modules may be provided to the mobile terminal 100 for simultaneous broadcast reception or broadcast channel switching for at least two broadcast channels.

The mobile communication module 112 transmits and receives a wireless signal to and from at least one of a BS, an external UE, and a server on a mobile communication network according to technical standards or communication schemes (e.g. Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), or New Radio access technology (3GPP NR)).

The wireless signal may include a voice call signal, a video call signal, or various types of data according to transmission and reception of text/multimedia messages.

The wireless Internet module 113 refers to a module for wireless Internet access and may be embedded in or externally attached to the mobile terminal 100. The wireless Internet module 113 may transmit and/or receive wireless signals via communication networks according to wireless Internet technologies.

The wireless Internet technology includes, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and 3GPP NR, and the wireless Internet module 113 transmits and receives data according to at least one wireless Internet technology in a range including the Internet technology not listed above.

The wireless Internet module 113, which performs wireless Internet access through the mobile communication network, may be understood as a type of the mobile communication module 112 when the wireless Internet connection by Wibro, HSDPA, HSUPA, GSM, CDMA, WCDMA, LTE, LTE-A, 3 GPP new NR, and the like is performed through a mobile communication network.

The short-range communication module 114 may be for short-range communication, and may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies. The short-range communication module 114 may support wireless communication between the mobile terminal 100 and a wireless communication system, between the mobile terminal 100 and another mobile terminal 100, or between the mobile terminal 100 and a network in which another mobile terminal 100 (another server) is located, through wireless personal area networks.

Here, another mobile terminal 100 may be a wearable device (e.g., a smart watch, a smart glass, a neckband, or a head mounted display (HMD)), which is exchangeable data (connectable) with the mobile terminal 100. The short-range communication module 114 may sense (or recognize) the wearable device, which is communicable with the mobile terminal 100 around the mobile terminal 100. When the detected wearable device is a device which is authenticated to communicate with the mobile terminal 100 according to the present disclosure, the processor 120 may transmit at least a portion of data processed in the mobile terminal 100 to the wearable device through the short-range communication module 114. Thus, a user of the wearable device may use the data processed in the mobile terminal 100 on the wearable device. For example, when a call is received in the mobile terminal 100, the user may perform a phone call through the wearable device or when a message is received in the mobile terminal 100, the user may check the received message through the wearable device.

The local area communication module 114 makes screen mirroring with a TV located at home or a display inside a vehicle and performs a corresponding function based on, for example, mirrorlink or Miracast standards. The mobile terminal 100 may directly control the display of the TV or the inside of the vehicle.

The location information module 115 is a module for obtaining a location (or current location) of a mobile terminal, and a representative example thereof includes a global positioning system (GPS) module or a wireless fidelity (WiFi) module. For example, the mobile terminal may obtain the location of the mobile terminal by using a signal transmitted from a GPS satellite when the GPS module is utilized. As another example, when a Wi-Fi module is utilized, the mobile terminal may obtain a location of the mobile terminal based on information of a Wireless Access Point (AP) for transmitting or receiving a wireless signal to or from the Wi-Fi-Fi module. As necessary, the location information module 115 may alternatively or additionally perform any of the other modules of the transceiver 110 to obtain data about the location of the mobile terminal. The location information module 115 is a module used to obtain a location (or current location) of the mobile terminal, and is not limited to a module for directly calculating or obtaining the location of the mobile terminal.

Each of the broadcast receiving module 111, the mobile communication module 112, the short-range communication module 114, and the location information module 115 may be implemented as a separate module for performing a corresponding function, or functions corresponding to two or more of the broadcast receiving module 111, the mobile communication module 112, the short-range communication module 114, and the location information module 115 may be implemented by one module.

The input unit 170 is for inputting image information (or signal), audio information (or signal), data, or information input from a user, and the mobile terminal 100 may include one or more cameras 171 for inputting image information.

The camera 171 processes image frames of still pictures or video obtained by an image sensor in a video call mode or a photographing mode. The processed image frames may be displayed on the display unit 151 or stored in the memory 130. A plurality of cameras 171 provided in the mobile terminal 100 may be arranged to form a matrix structure, and a plurality of pieces of image information having various angles or focal points may be input to the mobile terminal 100 through the camera 171 forming the matrix structure as described above. The cameras 171 may be located in a stereoscopic arrangement to obtain left and right images for implementing a stereoscopic image.

The microphone 172 processes an external audio signal into electrical voice data. The processed audio data may be variously used according to a function being executed in the mobile terminal 100 (or an application program being executed). Various noise removal algorithms for removing noise generated in a process of receiving an external audio signal may be implemented in the microphone 172.

The user input unit 173 is configured to receive information from a user, and when information is input through the user input unit 173, the processor 120 may control an operation of the mobile terminal 100 to correspond to the input information. The user input unit 173 may include a mechanical input device (or a mechanical key, for example, a button, a dome switch, a jog wheel, or a jog switch located on the front, rear, or side of the mobile terminal 100) and a touch-type input device. For example, the touch-type input device may be a virtual key, a soft key, or a visual key displayed on a touch screen through software processing, or may be a touch key located at a portion other than the touch screen. The virtual key or the visual key may be displayed on a touch screen in various forms, for example, graphic, text, icon, video, or a combination thereof.

The sensing unit 140 senses at least one of internal information of the mobile terminal, surrounding environment information of the mobile terminal, and user information, and generates a corresponding sensing signal. Based on the sensing signal, the processor 120 may control driving or operation of the mobile terminal 100 or perform data processing, functions, or operations related to an application program n installed in the mobile terminal 100. Representative examples of various sensors provided in the sensing unit 140 will now be described in more detail.

First, the proximity sensor 141 refers to a sensor that detects the presence or absence of an object approaching or near a predetermined detection surface without mechanical contact by using an electromagnetic field or infrared light. The proximity sensor 141 may be located at an inner region of the mobile terminal covered by the touch screen, or near the touch screen.

Examples of the proximity sensor 141 include a transmissive type photoelectric sensor, a direct reflective type photoelectric sensor, a mirror reflective type photoelectric sensor, a high frequency oscillation type proximity sensor, a capacitance type proximity sensor, a magnetic type proximity sensor, and an infrared ray proximity sensor. When the touch screen is an electrostatic type, the proximity sensor 141 may be configured to detect proximity of the object by a change in an electric field due to proximity of an object having conductivity. In this case, the touch screen (touch sensor) may also be classified as a proximity sensor.

For convenience of description, an operation of recognizing that the object is located on the touch screen close to the touch screen without touching the touch screen will be referred to as a "proximity touch", and an operation in which an object actually comes in contact with the touch screen will be referred to as a "contact touch". A position where the object is in proximity touch on the touch screen means a position in which the object vertically corresponds to the touch screen when the object is closely touched. The proximity sensor 141 may detect a proximity touch and a proximity touch pattern (e.g. a proximity touch distance, a proximity touch direction, a proximity touch speed, a proximity touch time, a proximity touch position, or a proximity touch movement state). As described above, the processor 120 may process data (or information) corresponding to the proximity touch operation and the proximity touch pattern sensed through the proximity sensor 141, and further output visual information corresponding to the processed data on the touch screen. The processor 120 may control the mobile terminal 100 to process different operations or different data (or information) according to whether a touch with respect to the same point on the touch screen is either a proximity touch or a contact touch.

The touch sensor senses a touch (or a touch input) applied to the touch screen (or the display unit 151) by using at least one of various touch methods such as a resistive type, a capacitive type, an infrared type, an ultrasonic type, and a magnetic field method.

For example, the touch sensor may be configured to convert a change in a pressure applied to a specific portion of the touch screen or a capacitance generated in a specific portion into an electrical input signal. The touch sensor may be configured to detect a position, an area, a pressure at a time of touch, a capacitance at the time of touch, and the like, in which a touch object applying a touch on the touch screen is touched on the touch sensor. Here, the touch object is an object that applies a touch to the touch sensor, and may be, for example, a finger, a touch pen, a stylus pen, or a pointer.

As described above, when there is a touch input to the touch sensor, the corresponding signal(s) are transmitted to the touch controller. The touch controller processes the signal(s) and then transmits corresponding data to the processor 120. Accordingly, the processor 120 may recognize which region of the display unit 151 is touched. Here, the touch controller may be a component separate from the processor 120, or the processor 120.

The processor 120 may execute the same or different controls according to a type of touch object that touches the touch screen (or a touch key provided in addition to the touch screen). Whether to execute the same or different control according to a type of touch object may be determined according to an operating state of the mobile terminal 100 or an application program currently executed.

The touch sensor and the proximity sensor described above may be independently or in combination and may sense various types of touches such as a short (or tap) touch, a long touch, a multi touch, a drag touch, a flick touch, a pinch-in touch, a pinch-out touch, a swipe touch, or a hovering touch for the touch screen.

An ultrasonic sensor may recognize location information of a sensing object by using ultrasonic waves. The processor 120 may calculate the location of a wave source through information sensed by an optical sensor and a plurality of ultrasonic sensors. The location of the wave source may be calculated using a very fast property of light than ultrasonic waves, that is, a time when light reaches the optical sensor is very faster than a time at which the ultrasonic wave reaches the ultrasonic sensor. In more detail, the location of the wave source may be calculated using a time difference with a time at which the ultrasonic wave reaches based on light as a reference signal.

The camera 171 may include at least one of a camera sensor (for example, a CCD camera or a CMOS camera), a photo sensor (or an image sensor), and a laser sensor.

The camera 171 and the laser sensor may be combined with each other and may detect a touch of a detection object with respect to a 3D stereoscopic image. The photo sensor may be stacked on the display device, and the photo sensor may be configured to scan a movement of a sensing object close to the touch screen. In more detail, the photo sensor may include photo diodes and transistors at rows and columns to scan contents placed on the photo sensor by using an electrical signal which changes according to the amount of applied light. That is, the photo sensor performs the coordinate calculation of the sensing object according to the amount of change in light, through which the location information of the object to be sensed may be obtained.

The display unit 151 is configured to output information processed in the mobile terminal 100. For example, the display unit 151 may display execution screen information of an application program executed in the mobile terminal 100 or user interface (UI) and graphic user interface (GUI) information according to the execution screen information.

The display unit 151 may be implemented as a stereoscopic display unit for displaying stereoscopic images.

In the stereoscopic display unit, a three-dimensional (3D) display method such as a stereoscopic method (glasses type), an auto stereoscopic method (non-glass method), and a projection method (a holographic method) may be applied.

The audio output module 152 may output audio data received from the transceiver 110 or stored in the memory 130 in a call signal reception mode, a call mode, a recording mode, a voice recognition mode, a broadcast reception mode, and the like. The audio output module 152 may output audible output related to a function (e.g. a call signal reception sound, or a message reception sound) performed by the mobile terminal 100. The audio output module 152 may include a receiver, a speaker, and a buzzer.

The haptic module 153 may be configured to generate various tactile effects that a user experiences. A typical example of a tactile effect generated by the haptic module 153 may be vibration. The strength and pattern of the vibration generated by the haptic module 153 may be controlled by user selection or setting of the processor. For example, the haptic module 153 may output different vibrations in a combining manner or a sequential manner.

In addition to the vibration, the haptic module 153 may generate various tactile effects such as arrangements of pins that move vertically with respect to the contact skin surface, an injection force or suction force of air through an injection port or a suction port, an effect of stimulation on a skin surface, a contact of an electrode, or an electrostatic force, and an effect caused by reproduction of cold and hot sensation by using an endothermic or exothermic element.

The haptic module 153 may also be implemented to allow a user to feel a tactile effect through a muscle sensation such as the fingers or arm of a user, as well as transferring the tactile effect through direct contact. Two or more haptic modules 153 may be provided according to the configuration of the mobile terminal 100.

The optical output module 154 outputs a signal for notifying occurrence of an event using light of a light source of the mobile terminal 100. Examples of events generated in the mobile terminal 100 may include message reception, call signal reception, a missed call, an alarm, a schedule notice, an email reception, and information reception through an application.

The signal output by the optical output unit 154 is implemented as a mobile terminal emits a single color or a plurality of colors to a front surface or a rear surface. The signal output may be terminated by the mobile terminal detecting event confirmation of the user.

The interface unit 160 serves as an interface for external devices to be connected to the mobile terminal 100. The interface unit 160 may receive data from an external device, receive power to transfer to each component in the mobile terminal 100, or transmit internal data of the mobile terminal 100 to an external device. For example, the interface unit 160 may include a wired/wireless headset port, an external charger port, a wired/wireless data port, a memory card port, a port for connecting a device having an identification module, an audio input/output (I/O) port, or an earphone port.

The identification module may be a chip that stores various information for authenticating authority of using the mobile terminal 100 and may include a user identity module (UIM), a subscriber identity module (SIM), and a universal subscriber identity module (USIM). A device having the identification module (hereinafter, referred to as 'identification device') may be manufactured in the form of a smart card. Accordingly, the identifying device may be connected to the terminal 100 via the interface unit 160.

When the mobile terminal 100 is connected to an external cradle, the interface unit 160 may serve as a passage to allow power from the cradle to be supplied to the mobile terminal 100 or may serve as a passage to allow various command signals input by the user from the cradle to be transferred to the mobile terminal 100. The various command signals or the power input from the cradle may operate as a signal for recognizing that the mobile terminal 100 is accurately mounted on the cradle.

The memory 130 may store programs for operations of the processor 120 and temporarily store input/output data (for example, phonebook, messages, still images, or videos). The memory 130 may store data related to various patterns of vibrations and audio which are output in response to a touch input on the touch screen.

The memory 130 may include, for example, a flash memory type, a hard disk type, a solid state disk type, a silicon disk drive type (SDD) type, a multimedia card micro type, a card type memory (e.g. an SD or an XD couple memory), a random access memory (RAM), A storage medium of at least one of a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may also operate in relation to a web storage that performs a storage function of the memory 130 on the Internet.

As described above, the processor 120 may typically control an operation related to an application program and the typically overall operation of the mobile terminal 100. For example, when the state of the mobile terminal satisfies a configured condition, the processor 120 may execute or release a lock state for limiting input of a control command of the user to the applications.

The processor 120 may perform control and processing related with voice calls, data communications, video calls, and the like, or perform pattern recognition processing to recognize a handwriting input or a picture drawing input performed on the touch screen as characters or images, respectively. To implement various embodiments described below on the mobile terminal 100 according to the present disclosure, the processor 120 may control any one or multiple of the above-described components by combining the above-described components.

The power supply unit 190 receives external power and internal power under the control of the processor 120 and supplies power required for the operation of each component. The power supply unit 190 may include a battery, and the battery may be an embedded battery configured to be charged, and may be detachably coupled to s terminal body for charging or the like.

The power supply unit 190 may include a connection port, and the connection port may be configured as an example of the interface 160 to which an external charger for supplying power to charge the battery is electrically connected.

As another example, the power supply unit 190 may be configured to charge the battery in a wireless manner without using the connection port. In this case, the power supply unit 190 may receive power from an external wireless power transmitter using at least one of an inductive coupling method based on magnetic induction or a magnetic resonance coupling method based on electromagnetic resonance.

Various embodiments described herein may be implemented in a computer-readable medium using, for example, software, hardware, or any combination thereof.

The mobile terminal may be extended to a wearable device which may be worn on a human body as well as a device mainly held by the user. Examples of the wearable device include a smart watch, a smart glass, or a head mounted display (HMD). Hereinafter, examples of a mobile terminal expanded to a wearable device will be described.

The wearable device may exchange data (be connected) with another mobile terminal 100. The short-range communication module 114 may sense (or recognize) the wearable device, and may allow communication between the wearable device and the mobile terminal 100. When the sensed wearable device is a device which is authenticated to communicate with the mobile terminal 100, the processor 120 may transmit at least a portion of data processed in the mobile terminal 100 to the wearable device through the short-range communication module 114. Thus, the user may use the data processed in the mobile terminal 100 on the wearable device. For example, when a call is received in the mobile terminal 100, a phone call may be performed through the wearable device, or when a message is received in the mobile terminal 100, the received message may be checked through the wearable device.

Examples of communication systems applicable to the present disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

Figure 12:
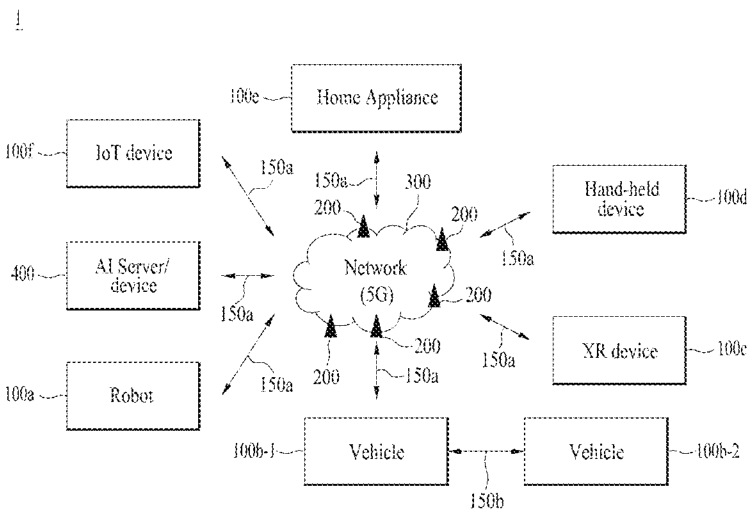

FIG. 12 illustrates a communication system 1 applied to the present disclosure.

Referring to FIG. 12, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device 200*a* can operate as a BS/network node with respect to other wireless devices.

The wireless devices 100*a* to 100*f* can be connected to the network 300 via the BSs 200. An AI technology can be applied to the wireless devices 100*a* to 100*f* and the wireless devices 100*a* to 100*f* can be connected to the AI server 400 via the network 300. The network 300 can be configured using a 3G network, a 4G (e.g., LTE) network, or a 5G (e.g., NR) network. Although the wireless devices 100*a* to 100*f* can communicate with each other through the BSs 200/network 300, the wireless devices 100*a* to 100*f* can perform direct communication (e.g., sidelink communication) with each other without passing through the BSs/network. For example, the vehicles 100*b*-1 and 100*b*-2 can perform direct communication (e.g. V2V/V2X communication). The IoT device (e.g., a sensor) can perform direct communication with other IoT devices (e.g., sensors) or other wireless devices 100*a* to 100*f*.

Wireless communication/connections 150*a*, 150*b*, or 150*c* can be established between the wireless devices 100*a* to 100*f*/BS 200, or BS 200/BS 200. Herein, the wireless communication/connections can be established through various RATs (e.g., 5G NR) such as UL/DL communication 150*a*, sidelink communication 150*b* (or, D2D communication), or inter BS communication (e.g., relay, integrated access backhaul (IAB)). The wireless devices and the BSs/the wireless devices can transmit/receive radio signals to/from each other through the wireless communication/connections 150*a* and 150*b*. For example, the wireless communication/connections 150*a* and 150*b* can transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Examples of wireless devices applicable to the present disclosure

Figure 13:
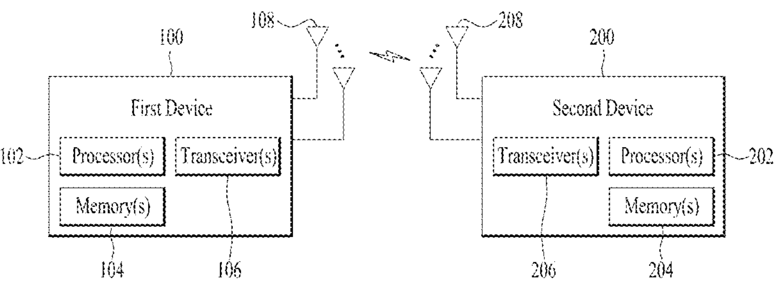

FIG. 13 illustrates wireless devices according to embodiments of the present disclosure.

Referring to FIG. 13, a first wireless device 100 and a second wireless device 200 can transmit radio signals through a variety of RATs (e.g., LTE and NR). Herein, the first wireless device 100 and the second wireless device 200 can correspond to the wireless device 100*x* and the BS 200 and/or two of the wireless devices 100*a*-100*f* of FIG. 12.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106. The processor(s) 102 can receive radio signals including second information/signals through the transceiver 106 and then store information obtained by processing the second information/signals in the memory(s) 104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF) unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206. The processor(s) 202 can receive radio signals including fourth information/signals through the transceiver(s) 106 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document. The one or more processors 102 and 202 can generate messages, control information, data, or information according to the descriptions, functions, procedures, proposals, methods, and/or operational flowcharts disclosed in this document. The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices. The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports). The one or more transceivers 106 and 206 can convert received radio signals/channels etc. from RF band signals into baseband signals in order to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 14:
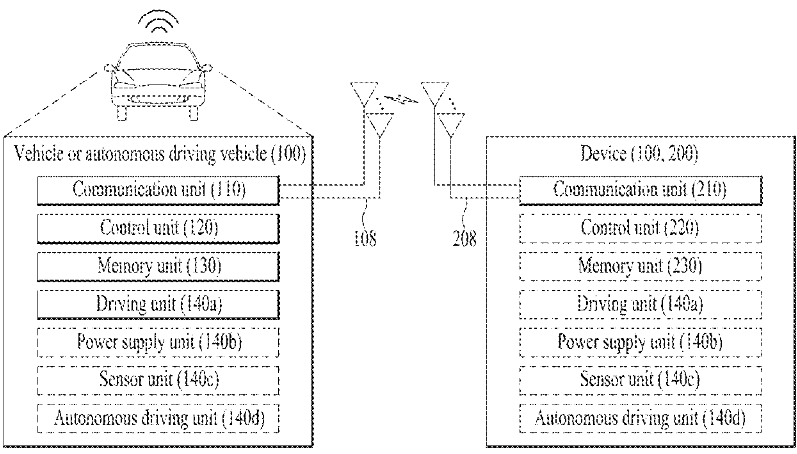

Examples of a Vehicle or an Autonomous Driving Vehicle Applicable to the Present Disclosure FIG. 14 illustrates a vehicle or an autonomous driving vehicle according to an embodiment of the present disclosure. The vehicle or autonomous driving vehicle can be implemented by a mobile robot, a car, a train, a manned/unmanned aerial vehicle (AV), a ship, etc.

Referring to FIG. 14, a vehicle or autonomous driving vehicle 100 can include an antenna unit 108, a communication unit 110 (e.g., transceiver), a control unit 120 (e.g., controller or processor), a driving unit 140*a*, a power supply unit 140*b*, a sensor unit 140*c*, and an autonomous driving unit 140*d*. The antenna unit 108 can be configured as a part of the communication unit 110.

The communication unit 110 can transmit and receive signals (e.g., data and control signals) to and from external devices such as other vehicles, BSs (e.g., gNBs and road side unit devices), and servers. The control unit 120 can perform various operations by controlling elements of the vehicle or the autonomous driving vehicle 100. The control unit 120 can include an ECU. The driving unit 140*a* can cause the vehicle or the autonomous driving vehicle 100 to drive on a road. The driving unit 140*a* can include an engine, a motor, a powertrain, a wheel, a brake, a steering device, etc. The power supply unit 140*b* can supply power to the vehicle or the autonomous driving vehicle 100 and include a wired/wireless charging circuit, a battery, etc. The sensor unit 140*c* can acquire a vehicle state, ambient environment information, user information, etc. The sensor unit 140*c* can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 can receive map data, traffic information data, etc. from an external server. The autonomous driving unit 140*d* can generate an autonomous driving path and a driving plan from the obtained data. The control unit 120 can control the driving unit 140*a* such that the vehicle or the autonomous driving vehicle 100 can move along the autonomous driving path according to the driving plan (e.g., speed/direction control). In the middle of autonomous driving, the communication unit 110 can aperiodically/periodically acquire recent traffic information data from the external server and acquire surrounding traffic information data from neighboring vehicles. In the middle of autonomous driving, the sensor unit 140*c* can obtain a vehicle state and/or surrounding environment information. The autonomous driving unit 140*d* can update the autonomous driving path and the driving plan based on the newly obtained data/information. The communication unit 110 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

Examples of a vehicle and AR/VR applicable to the present disclosure

FIG. 16 illustrates a vehicle applied to the present disclosure. The vehicle can be implemented as a transport means, an aerial vehicle, a ship, etc.

Referring to FIG. 16, a vehicle 100 can include a communication unit 110, a control unit 120, a memory unit 130, an I/O unit 140*a*, and a positioning unit 140*b*.

The communication unit 110 can transmit and receive signals (e.g., data and control signals) to and from external devices such as other vehicles or BSs. The control unit 120 can perform various operations by controlling constituent elements of the vehicle 100. The memory unit 130 can store data/parameters/programs/code/commands for supporting various functions of the vehicle 100. The I/O unit 140*a* can output an AR/VR object based on information within the memory unit 130. The I/O unit 140*a* can include an HUD. The positioning unit 140*b* can acquire information about the position of the vehicle 100. The location information can include information about an absolute position of the vehicle 100, information about the position of the vehicle 100 within a traveling lane, acceleration information, and information about the position of the vehicle 100 from a neighboring vehicle. The positioning unit 140*b* can include a GPS and various sensors.

As an example, the communication unit 110 of the vehicle 100 can receive map information and traffic information from an external server and store the received information in the memory unit 130. The positioning unit **140*b* can obtain the vehicle location information through the GPS and various sensors and store the obtained information in the memory unit 130. The control unit 120 can generate a virtual object based on the map information, traffic information, and vehicle location information and the I/O unit 140*a* can display the generated virtual object in a window in the vehicle (1410 and 1420). The control unit 120 can determine whether the vehicle 100 normally drives within a traveling lane, based on the vehicle location information. If the vehicle 100 abnormally exits from the traveling lane, the control unit 120 can display a warning on the window in the vehicle through the I/O unit 140*a*. In addition, the control unit 120 can broadcast a warning message regarding driving abnormity to neighboring vehicles through the communication unit 110. According to situation, the control unit 120** can transmit the vehicle location information and the information about driving/vehicle abnormality to related organizations.

INDUSTRIAL APPLICABILITY

The above-described embodiments of the present disclosure are applicable to various mobile communication systems.

The invention claimed is:

1. An operation method of a second node related to soft vehicle-to-everything (V2X) in a wireless communication system, the operation method comprising:
- receiving a negotiation message from a first node by the second node;
- selecting a delegator based on the negotiation message by the second node; and
- receiving a soft V2X-related message transmitted by a third node through the delegator by the second node,
- wherein the second node receives the negotiation message through an interface related to WiFi Aware and receives the soft V2X-related message through a message queuing telemetry transport (MQTT) server.

2. The operation method of claim 1, wherein the third node has a same topic as the first node and the second node and is a node without an interface related to the WiFi Aware.

3. The operation method of claim 2, wherein, based on that the second node is not a delegator, the second node selects a delegator through comparison of score field values of the negotiation message.

4. The operation method of claim 3, wherein, based on that the first node is not a delegator, the second node compares a score field value thereof with a score field value of the negotiation message and selects a node with a smaller score field value as a delegator.

5. The operation method of claim 3, wherein, based on that the first node is a delegator, the second node adds the first node to a peer delegator list and then selects a node with a smallest score field value in the peer delegator list as a delegator.

6. The operation method of claim 3, wherein the score field value increases by 1 based on that a message of another node as a delegator is transmitted to an MQTT server.

7. The operation method of claim 2, wherein the second node transmits the soft V2X-related message to the first node through an interface related to the WiFi Aware.

8. The operation method of claim 7, wherein, based on the soft V2X-related message is transmitted from a pedestrian, the soft V2X-related message is not transmitted to the pedestrian.

9. The operation method of claim 1, wherein, based on the second node is a delegator, the second node creates geocast connection with the MQTT server.

10. The operation method of claim 1, wherein the negotiation message includes a node ID field, a topic ID field, a field indicating whether the second node is a delegator, and a score field.

11. The operation method of claim 1, wherein the soft V2X-related message is any one of a basic safety message (BSM) or a personal safety message (PSM).

12. The operation method of claim 11, wherein the BSM or PSM message includes a node ID field, a topic ID field, a delegator request field indicating whether to request message transmission to a delegator, and a type field indicating a type of node from among a pedestrian or a vehicle.

13. A second node related to soft vehicle-to-everything (V2X) in a wireless communication system, the second node comprising:
- at least one processor; and
- at least one computer memory operatively connected to the at least one processor and configured to store instructions that when executed causes the at least one processor to perform operations,
- wherein the operations include:
- receiving a negotiation message from a first node;
- selecting a delegator based on the negotiation message; and
- receiving a soft V2X-related message transmitted by a third node through the delegator, and
- the second node receives the negotiation message through an interface related to WiFi Aware and receives the soft V2X-related message through a message queuing telemetry transport (MQTT) server.

14. A processor for performing operations for a second node in a wireless communication system, the operations comprising:
- receiving a negotiation message from a first node;
- selecting a delegator based on the negotiation message; and
- receiving a soft vehicle-to-everything (V2X)-related message transmitted by a third node through the delegator,
- wherein the second node receives the negotiation message through an interface related to WiFi Aware and receives the soft V2X-related message through a message queuing telemetry transport (MQTT) server.

15. A non-transitory computer-readable storage medium storing at least one computer program including an instruction that when executed by at least one processor causes the at least one processor to perform operations for a relay UE, the operations comprising:
- receiving a negotiation message from a first node;
- selecting a delegator based on the negotiation message; and
- receiving a soft V2X-related message transmitted by a third node through the delegator,
- wherein the second node receives the negotiation message through an interface related to WiFi Aware and receives the soft V2X-related message through a message queuing telemetry transport (MQTT) server.

* * * * *